United States Patent
Goodhue

(12)
(10) Patent No.: US 6,412,519 B1
(45) Date of Patent: Jul. 2, 2002

(54) DUCT CONNECTING SYSTEM HAVING DOUBLE WALLED TRANSVERSE FLANGES

(75) Inventor: William V. Goodhue, North Kingstown, RI (US)

(73) Assignee: Met-Coil Systems Corporation, Lisle, IL (US)

(*) Notice: Subject to any disclaimer, the term of this patent is extended or adjusted under 35 U.S.C. 154(b) by 0 days.

(21) Appl. No.: 09/767,962

(22) Filed: Jan. 24, 2001

(51) Int. Cl.[7] .................................................. F16L 9/22
(52) U.S. Cl. ................. 138/109; 138/155; 138/DIG. 4; 285/363; 285/424
(58) Field of Search ................................. 138/109, 155, 138/177, 178, DIG. 4; 285/363, 424

(56) References Cited

U.S. PATENT DOCUMENTS

| | | | | |
|---|---|---|---|---|
| 760,216 | A | * 5/1904 | Laws | 138/DIG. 4 |
| 4,466,641 | A | * 8/1984 | Heilman et al. | 285/424 |
| 4,579,375 | A | * 4/1986 | Fischer et al. | 285/424 |
| 4,713,959 | A | * 12/1987 | Bennett | 72/410 |
| 4,739,802 | A | * 4/1988 | Meinig | 138/155 |
| 4,865,365 | A | * 9/1989 | Meinig | 138/155 |
| 4,867,490 | A | * 9/1989 | Arnoldt | 285/424 |
| 4,995,648 | A | * 2/1991 | Jackson | 285/424 |
| 5,358,013 | A | * 10/1994 | McClain | 138/155 |
| 5,926,937 | A | * 7/1999 | Goodhue | 29/509 |
| 6,081,985 | A | * 7/2000 | Fischer et al. | 29/509 |

* cited by examiner

Primary Examiner—James Hook
(74) Attorney, Agent, or Firm—McCormick, Paulding & Huber LLP

(57) ABSTRACT

The invention relates to an improved system for connecting the ends of sheet metal ducts wherein each duct end is provided with a double walled frame. Corner connectors defining perpendicularly extending arms are associated with each frame, and bolts or other fasteners are utilized for connecting the connectors and frames. The respective double walled frames comprise integral sections at the duct ends. The sections include an upturned portion extending perpendicularly outwardly from the duct wall, a second portion bent rearwardly from the outer end of the first portion, a third return portion, and an inner wall portion extending from the outer end of the third portion and forming a L-shaped portion. When the frame is formed in this fashion, it is adapted to receive the side edges of respective arms of corner connectors whereby the ducts may be efficiently assembled by locating corner connectors in place and thereafter applying the fasteners used for maintaining the assembly.

25 Claims, 2 Drawing Sheets

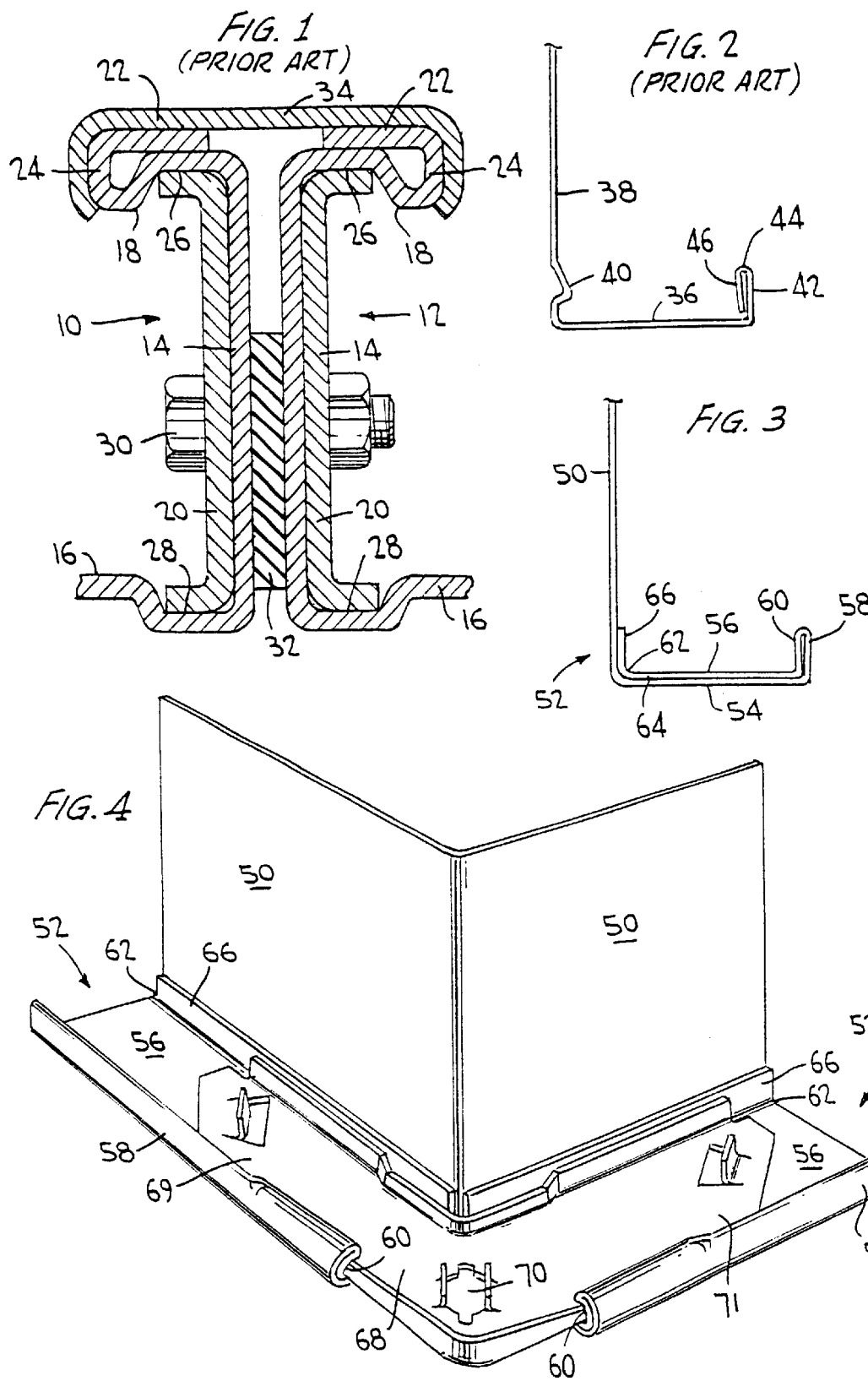

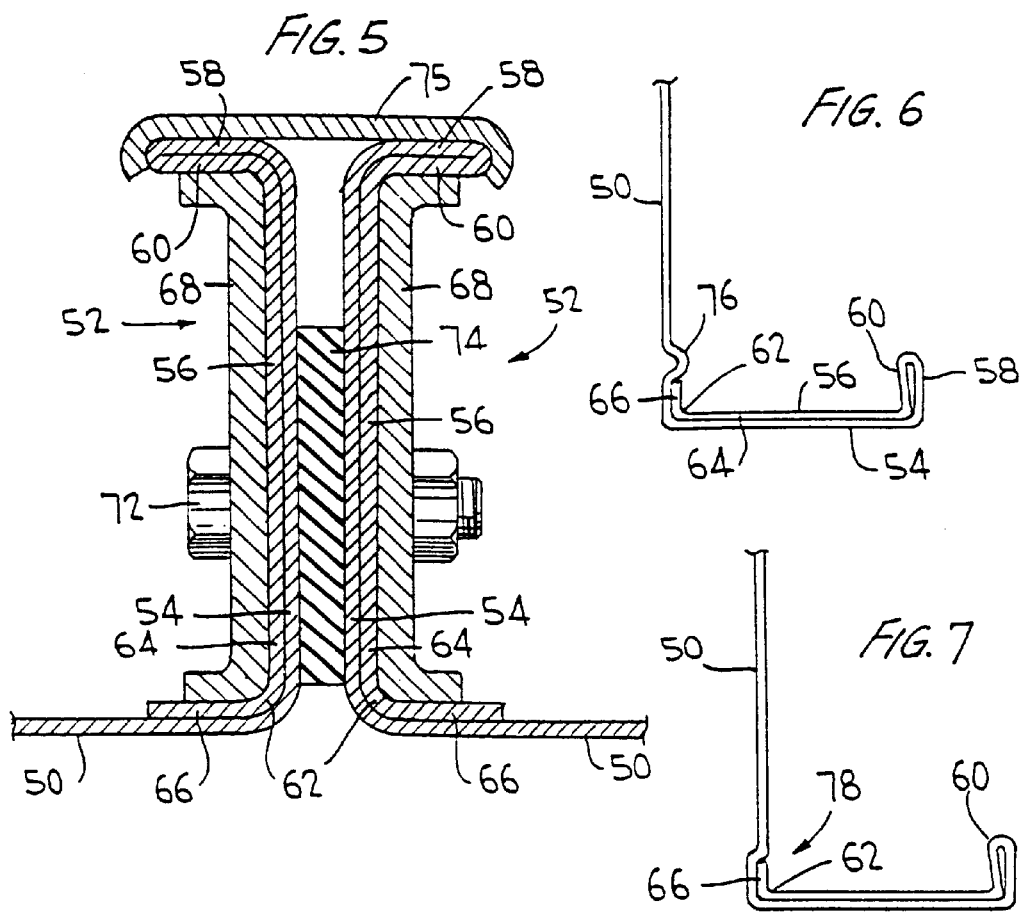
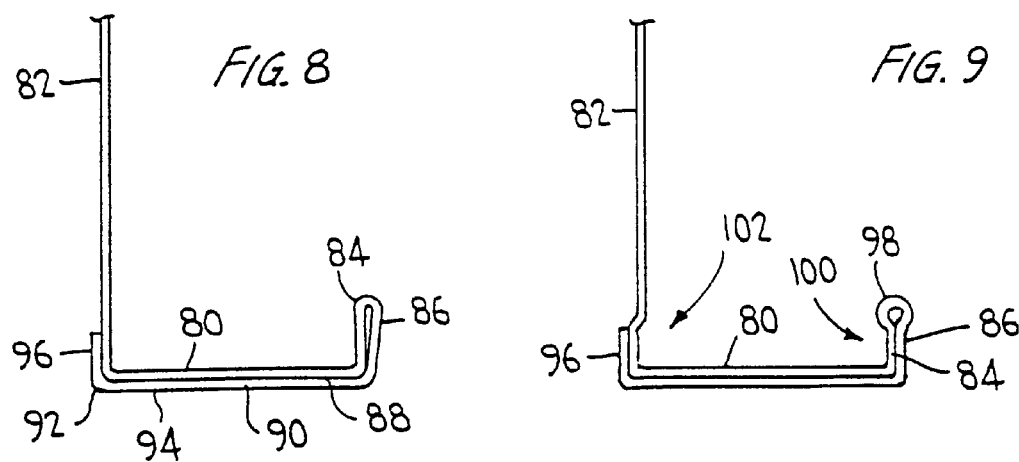

DUCT CONNECTING SYSTEM HAVING DOUBLE WALLED TRANSVERSE FLANGES

FIELD OF INVENTION

This invention relates to an improved system for connecting the ends of four sided rectangular sheet metal ducts wherein each duct end is provided with a double walled integral transverse flange.

BACKGROUND OF THE INVENTION

This invention relates to an improved means for connecting the ends of a pair of sheet metal duct sections. The invention particularly involves an assembly of the type including frame members defining double walled integral transverse flanges located at a duct end with adjacent frame members joined to each other by angular corner connectors.

The prior art, particularly Heilman et al U.S. Pat. No. 4,466,641 and Fischer et al U.S. Pat. No. 4,579,375, the disclosures of which are incorporated herein by reference, disclose duct connecting systems using integral transverse flanges. These arrangements include a first portion extending perpendicularly outwardly from the duct wall and a second portion bent rearwardly from the outer end of the first portion thereby forming opposing channels. The side edges of an arm of a corner connector are adapted to be snapped and crimped into place in these channels for secure assembly. To hold the adjacent duct sections together, the adjacent sections are bolted to each other at their four corner connectors, thereby forming an assembled section of duct.

Apparatus to manufacture the Heilman et al. invention is manufactured and sold by The Lockformer Company of Lisle, Ill. and is referred to in the industry as the TDC ("Transverse Duct Connector") system. Apparatus to manufacture the Fischer et al duct is manufactured and sold by Engel Industries, Inc. of St. Louis, Mo. and is referred to in the industry as the TDF ("Transverse Duct Flange") system. While both systems have provided the industry with a useful duct system, there remains a need in the industry for improvements to the systems as discussed herein.

FIG. 1 illustrates in cross section the roll-formed shape of the end 10 of one duct, and the roll-formed shape of the end 12 of an adjacent duct as disclosed in Heilman et al. The frame includes a first upturned portion 14 extending perpendicularly outwardly from the duct wall 16 and a second portion 18 bent rearwardly into position opposite an end portion of the duct wall. The distance between the rearwardly bent portion 18 and the end portion of the duct wall substantially corresponds to the width of an arm of a corner connector 20. The side edges of each such arm of a corner connector 20 are adapted to engage the respective surfaces of the rearwardly bent second portion 18 and duct wall end portion whereby the corner connector 20 is held in position relative to the frame by a retainer means defined by the rearwardly bent second portion 18.

The preferred embodiment of the Heilman et al invention includes a third outwardly facing return portion 22 at the outward edge of the rearwardly bent second portion 18 thereby forming a bead 24. A first channel 26 is formed between the bead 24 and the outwardly extending upturned portion 14, and a second channel 28 is formed in the duct wall opposite the first channel 26. The side edges of an arm of a corner connector 20 are adapted to be snapped into place in these channels 26, 28 for secure assembly of the corner connectors relative to a frame. It has been found however that the corner connectors will be displaced during manufacture and transport of the duct. Therefore, the duct flanges must be crimped (not shown in FIG. 1) over the adjacent arms of a corner connector to secure the corner connector in place within a duct flange.

Pursuant to Heilman et al, when assembling one duct with another, the respective frames and associated corner connectors 20 are brought together, and a bolt 30 or other suitable fastener is employed for achieving the desired connection. Prior to completion of this connection, a gasket 32 may be located between the respective frame portions for conventional purposes.

In order to strengthen the resultant duct joint formed by the Heilman et al invention, each of the arms of a corner connector 20 is provided with an offset ear which may be used for retaining a stiffener means, comprising a strip of spring steel or the like. Each stiffener means is held at its end beneath the offset ear and at its sides between channels 26 and 28. Furthermore, a clip 34 may also be engaged around the adjacent frame portions to provide a smooth exposed joint and to strengthen the joint.

The Fischer et al duct flange, illustrated at FIG. 2, uses a modification of the Heilman et al invention and discloses a duct connecting system having an outstanding web portion 36 extending at 90 degrees from the duct wall 38, with an outward-formed tracking ridge 40 spaced inwardly thereof and formed outwardly of the surface of the assembled duct wall 38. At the outer extremity of the web 36 is an outer flange 42 having a turned-under rounded edge 44, formed at an angle slightly in excess of 180 degrees and terminating in a spring margin 46 which extends back toward the web 36 and normally stands inwardly away from the outer flange 42. "Button lock" lances are said to be provided through the rounded-back edge 44 projecting aft. The spacing between the web 36 and the tracking ridge 40, which corresponds to the spacing from the web 36 of the somewhat bulbous rounded portion of the turned-under edge 44, is fixed to accommodate the side edges of an arm of a corner connector. The depth between the spring margin 46 and the outer surface of the duct wall 38 between the ridge 40 and the web 36, is such that the leg portions of a corner connector will snap into position and are said to be held by the spring margins 46 and the lanced projections, trapped by the tracking ridge 40. However, it has also been found that corner connectors will fall out of the Fischer et al. duct flange without crimping. Accordingly, the duct flange of the Fischer et al. duct, in practice, is crimped to hold a corner connector in place.

As with the Heilman et al invention, the Fischer et al. duct can be readily joined with an adjacent duct end by means of bolts or fasteners. Furthermore, gasket material may also be located between adjacent frames without difficulty to decrease leakage.

In order to increase duct flange strength about the duct joint formed by the Fischer et al invention, optional reinforcing bars may be utilized between the arms of adjacent corner pieces. Each bar may be snapped in position behind the outwardly-formed ridge 40 and the rounded edge 44 of the outer flange 42, and retained by the lanced projections. If desired, an elongated clip can also be positioned around the joint formed by adjacent duct flanges to support the middle portion of the integral flanges. Incorporation of the clip and reinforcing bar with adjacent duct flanges, helps to prevent bellowing and leakage caused by pressure exerted by materials flowing within the duct.

After issuance of the Heilman et al and Fischer et al patents, the corner connector was manually inserted into the duct flange and then manually crimped with a hammer or the like. This was, among other things, time consuming, hard on the worker and expensive to the sheet metal contractor. These problems were solved by the Cornermatic® machine sold by Iowa Precision Industries, Inc., Cedar Rapids, Iowa, and covered by U.S. Pat. Nos. 5,321,880 and 5,283,944 to Goodhue. These patents disclose an automated method and apparatus, respectively, for placement of corner connectors in transverse duct flanges. The Cornermatic® apparatus and method automatically insert a connector, such as described in Goodhue U.S. Pat. No. 5,342,100, in a duct flange and secure the connector within the flange by crimping the outer portion of the flange over the adjacent arms of the corner connector. The inventions of the Goodhue patents have been a commercial success in the industry.

BRIEF DESCRIPTION OF THE INVENTION

A primary object of the invention is to provide a double walled integral transverse duct flange.

A further primary object of the invention is to provide a transverse duct flange which provides increased strength and rigidity across the joint created by adjacent integral transverse duct flanges.

A further primary object of the invention is to provide a transverse duct flange which will allow for the use of thinner gauge sheet metal in the construction of duct while providing the strength of a conventional duct flange using heavier gauge sheet metal.

Another object of the invention is to provide a transverse duct flange having additional strength which will alleviate the problems of bulging and leakage at adjacent duct flange joints.

A further object of the invention is to provide a transverse duct flange having additional strength which will alleviate the need to insert stiffeners or reinforcing bars, in ceratin applications, into the duct flange in order to strengthen the duct flange as is currently implemented with the prior art flanges.

A further object of the invention is to decrease the number of clips that are engaged about the respective connected adjacent flange portions to prevent leakage.

A further object of the invention is to provide a more cost efficient means of manufacturing and connecting sheet metal duct than the prior art.

The purposes of this invention are accomplished by providing for frame members defining double walled integral transverse flanges located at a duct end with adjacent frame members joined to each other by angular corner connectors. The invention comprises a duct having a transverse double walled flange. The double walled flange comprises an upturned portion extending perpendicularly outwardly from the duct wall, and a second portion bent rearwardly. The outward edge of the rearwardly bent portion is turned-under and rounded back inwardly toward the inside surface of the upturned portion forming a third return portion. This return portion is extended to the inside surface of the upturned portion and thereafter extended along the inside surface of the upturned portion forming a fourth inner wall portion extending perpendicularly inwardly toward the duct wall from the return portion. This inner wall portion terminates at a L-shaped portion.

In the alternative, the return portion may be turned-over and extended to the outside surface of the upturned portion and thereafter extended along the outside surface of the first portion forming an outside wall portion terminating at a L-shaped portion.

The inwardly and outwardly turned return portions disclosed above may form a bead similar to the bead disclosed in the Heilman et al patent thereby defining a first channel formed between the bead and the down-turned portion. A second channel may be formed in the duct wall opposite the first channel. The channel can be formed by creating a depression in the outside of the duct wall, as disclosed in Heilman et al, or by forming an outwardly facing ridge along the surface of the duct wall, as disclosed in Fischer et al. The side edges of an arm of a corner connector are adapted to be positioned into place in these channels, and thereafter the duct flange is crimped over the corner connector to secure it in place.

An additional aspect of the invention is that a second return portion can be formed at the outward end of the L-shaped portion and thereafter extended back over the flange as described above to produce a duct flange having a triple walled flange.

Assembling sections of sheet metal duct having a double walled flange arrangement of the type described by the present invention results in a stronger transverse duct joint. The stronger duct joint allows a contractor to use lighter gauge sheet metal, and ultimately less metal, than he would use if a duct connecting system utilizing the conventional single walled duct flange is implemented. Moreover, the increased transverse duct joint strength recognized when using the present invention potentially alleviates the need for employing stiffeners or reinforcing bars when assembling sections of duct. As a consequence of using lighter gauge sheet metal and removing the need for stiffeners or reinforcing bars, the present invention provides a more cost efficient means of connecting sheet metal duct than previously known.

BRIEF DESCRIPTION OF THE DRAWINGS

FIG. 1 is a fragmentary, cross-sectional view of a duct joint representative of the duct connecting system disclosed by Heilman et al;

FIG. 2 is a horizontal, sectional view of a duct wall and flange representative of the duct flange disclosed by Fischer et al;

FIG. 3 is a horizontal, sectional view of the of a double walled duct flange representative of a preferred embodiment of the present invention;

FIG. 4 a fragmentary perspective view of a duct flange characterized by the features of this invention;

FIG. 5 is a fragmentary, cross-sectional view of a duct joint representative of the preferred embodiment of the present invention;

FIG. 6 is a horizontal, sectional view of a duct wall and flanges representative of another embodiment of the duct flange of the present invention;

FIG. 7 is a horizontal, sectional view of a duct wall and flange representative of another embodiment of the duct flange of the present invention;

FIG. 8 is a horizontal, sectional view of a duct wall and flange representative of another embodiment of the duct flange of the present invention; and FIG. 9 is a horizontal, sectional view of a duct wall and flange representative of another embodiment of the duct flange of the present invention.

DETAILED DESCRIPTION OF THE PRESENTLY PREFERRED EMBODIMENTS

The preferred embodiment of the double walled transverse duct flange is shown in FIGS. 3, 4 and 5 where like numerals illustrate like portions of the invention. Alternative embodiments of the invention, which share like numbering with FIGS. 3, 4 and 5, are illustrated in FIGS. 6 and 7. Further alternative embodiments of the invention are illustrated in FIGS. 8 and 9 where like numerals illustrate like portions of the invention.

FIG. 3 illustrates a horizontal, sectional view of the of a double walled transverse duct flange representative of the preferred embodiment of the present invention. FIG. 4 illustrates fragmentary perspective view of a duct flange with an assembled corner connector as characterized by the features of this invention. FIG. 5 is a fragmentary, cross-sectional view of a duct joint representative of the preferred embodiment of the present invention (the crimping is not shown in this Figure).

The double walled transverse duct flange generally comprises a duct having a duct wall 50 and a flange 52. The flange 52 includes an upturned outer wall portion 54 extending perpendicularly from the duct wall 50 and an inner wall portion 56 overlying the upturned outer wall portion 54.

More specifically, the flange 52 comprises the upturned outer wall portion 54 which extends perpendicularly from duct wall 50 and a second rearwardly bent portion 58 extending opposite a portion of duct wall 50. The outward edge of rearwardly bent portion 58 is turned over inwardly and rounded back forming a return portion 60. Return portion 60 is extended to the inside surface of upturned outer wall portion 54. Inner wall portion 56 is formed at the outer edge of return portion 60 and extends perpendicularly inwardly toward duct wall 50 along the inside surface of upturned outer wall portion 54. Inner wall portion 56 is positioned adjacent to and in close relation to the inside surface of upturned outer wall portion 54. Inner wall portion 56 forms a L-shaped portion 62 at its intersection with duct wall 50 having a first leg 64 arranged adjacent to and in close relation with the inside surface of upturned outer wall portion 54 and a second leg 66 arranged adjacent to and in close relation with the outside surface of duct wall 50.

Inner wall portion 56 may, in the alternative, extend to the outside surface of duct wall 50, without terminating in L-shape portion 62. However, a portion of the strength and rigidity imparted to flange 52 when L-shaped portion 62 is included is lost when L-shaped portion 62 is not formed.

Referring now to FIG. 4, there is shown a fragmentary perspective view of a duct flange with an assembled corner connector 68 having substantially perpendicular arms 69, 71 and a bolt hole 70. The corner connector 68 is as disclosed in U.S. Pat. No. 5,342,100 to Goodhue, and is incorporated herein by reference. The corner connector 68 is preferably inserted into duct 50 by the Cornermatic® machine, although other means are also acceptable. Arms 69, 71 are adapted to engage the respective surfaces of return portion 60 and second leg 66 of L-shaped portion 62 whereby corner connector 68 is held in position relative to the flange 52 by a retainer means defined by return portions 60. Corner connector 68 is positioned adjacent to and in close relation with inner wall portion 56 and is secured within flange 52 by crimping rearwardly bent portion 58 and return portion 90 over arms 69, 71 of corner connector 68. The placement of corner connector 68 into flange 52 and subsequent crimping to secure corner connector 68 within flange 52 can be accomplished manually, but it is preferred that these steps be performed by the Cornermatic® machine or other apparatus and method covered by the Goodhue U.S. Pat. Nos. 5,321,880 and 5,283,944.

Referring now to FIG. 5, the double walled transverse flange of the invention of FIGS. 3 and 4 are shown connecting two adjacent sections of duct to provide a duct joint. When assembling adjacent duct sections, the respective flange portions and associated corner connectors are brought together, and a bolt 72 or other suitable fastener is employed for achieving the desired connection. Prior to completion of this connection, a gasket 74 may be located between the respective flange portions for conventional purposes. A clip 75 may also be positioned engaging the respective connected adjacent flange portions. Clip 75 serves to decrease leakage about the duct joint. The crimping of the duct flange to maintain the corner connection in place is not shown in FIG. 5.

A modification of the embodiment of the invention disclosed in FIGS. 3, 4 and 5, as shown at FIG. 6, provides additionally for an outwardly-formed tracking ridge 76, similar to the ridge disclosed in Fischer et al, formed outwardly from the duct wall SO and adjacent to the outer edge of second leg 66 of L-shaped portion 62. Tracking ridge 76 protrudes outwardly from duct wall 50 a distance beyond leg 66 of L-shaped portion 62 sufficient to form a channel between inner wall portion 56 and tracking ridge 76 capable of accommodating the side edges of an arm of a corner connector.

A further modification of the embodiment of the invention disclosed in FIGS. 3, 4 and 5, as shown at FIG. 7, provides additionally for an inwardly-formed channel 78 formed in duct wall 50 opposite return portion 60. Second leg 66 of L-shaped portion 62 is located adjacent to and in close relation with the outer surface of duct wall 50 which defines second channel 78, such that the side edges of an arm of a corner connector can be positioned against second leg 66 in channel 78 and against return portion 66 for secure assembly of the corner connectors relative to a frame.

An alternative embodiment to the inventions disclosed in FIGS. 3, 4, 5, 6 and 7, as shown at FIG. 8, provides for a transverse duct flange comprising an upturned inner wall portion 80 which extends perpendicularly from a duct wall 82 and a second rearwardly bent portion 84 extending opposite a portion of duct wall 82. The outward edge of rearwardly bent portion 84 is turned over outwardly away from duct wall 82 and rounded back forming a return portion 86. Return portion 86 is extended to provide an outside surface 88 of upturned inner wall portion 80. An outer wall portion 90 is formed at the outer edge of return portion 86 and extends perpendicularly inwardly toward duct wall 82 along outside surface 88 of upturned inner wall portion 80. Outer wall portion 90 is positioned adjacent to and in close relation to outside surface 88 of upturned inner wall portion 80. Outer wall portion 90 forms a L-shaped portion 92 at its intersection with duct wall 82 having a first leg 94 arranged adjacent to and in close relation with outside surface 88 of upturned inner wall portion 80 and a second leg 96 arranged adjacent to and in close relation with the inside surface of duct wall 82.

Outer wall portion 90 may, depending on the application, extend to the plane formed by outside surface 88 of duct wall 82, without terminating in a L-shape portion 92. It is noted, however, that the strength and rigidity imparted to flange joint when the L-shaped portion 92 is included is lost when L-shaped portion 92 is not formed.

A modification of the embodiment of the invention disclosed in FIG. 8, as shown at FIG. 9, provides additionally for a bead 98, similar to the bead disclosed by Heilman et al, defined by return portion 86 and rearwardly bent second portion 84. Bead 98 protrudes inwardly toward duct wall 82. A first channel 100 is formed between bead 98 and upturned inner wall portion 80, and an inwardly-formed second channel 102 is formed in duct wall 82 opposite first channel 100, as disclosed in Heilman et al. Second leg portion 96 arranged adjacent to and in close relation with the inside surface of duct wall 82 at second channel 102. The side edges of an arm of a corner connector are adapted to be positioned into place in channels 100, 102 for assembly of the corner connectors relative to a frame.

It is understood that various changes and modifications may be made to the above described inventions without departing from the scope of the invention and as particularly as defined in the following claims.

It is claimed:

1. A sheet metal duct section comprising:
   a duct wall; and
   an integral transverse double walled flange extending substantially perpendicular to said duct wall, wherein said double walled flange includes a first outer wall portion and a second inner wall portion, said first outer wall portion being parallel to and in substantial contact with said second inner wall portion along an entire length of said double walled flange.

2. A sheet metal duct section in accordance with claim 1 wherein said outer wall portion and said inner wall portion include a rearwardly bent portion.

3. A sheet metal duct section in accordance with claim 2 wherein said rearwardly bent portion forms a return portion, said return portion being rounded back inwardly.

4. A sheet metal duct section in accordance with claim 3 wherein said inner wall portion includes a L-shaped portion at its outward edge.

5. A sheet metal duct section in accordance with claim 2 wherein said rearwardly bent portion forms a return portion, said return portion being rounded back outwardly.

6. A sheet metal duct section in accordance with claim 5, wherein said outer wall portion includes a L-shaped portion at its outward edge.

7. A sheet metal duct section in accordance with claim 5 wherein said return portion forms a bead.

8. A sheet metal duct section in accordance with claim 2 wherein said duct wall has an outwardly-formed tracking ridge parallel to said double walled flange.

9. A sheet metal duct section in accordance with claim 2 wherein said duct wall has an inwardly-formed channel parallel to said double walled flange.

10. A sheet metal duct having a multi-walled integral transverse flange for connecting ends of sheet metal duct sections, the flange comprising:
    a section comprising an integral part of a duct wall, said duct wall having an inside surface and an outside surface;
    a first upturned outer wall portion extending outwardly from the duct wall, said upturned outer wall portion having an inside surface and an outside surface;
    a second portion bent rearwardly from the outer edge of said upturned outer wall portion into a position opposite an end of the duct wall;
    a third return portion turned-under and rounded back inwardly from the outer edge of said second portion, said return portion extending to the inside surface of said upturned outer wall portion; and
    a fourth inner wall portion extending from the outer edge of said returned portion to the outside surface of said duct wall, said inner wall portion being substantially coextensive with and uniformly spaced from said inside surface of said upturned outer wall portion.

11. A sheet metal duct in accordance with claim 10, wherein said inner wall portion forms a L-shaped portion at its outward edge, said L-shaped portion having a first arm arranged adjacent to and in close arrangement to said inside surface of said upturned outer wall portion and a second arm arranged adjacent to and in close relation to said outside surface of said duct wall.

12. A sheet metal apparatus in accordance with claim 10 wherein said duct has an outwardly-formed tracking ridge parallel and adjacent to said upturned outer wall portion, said ridge defining a channel formed between said ridge and said inner wall portion.

13. A sheet metal duct in accordance with claim 12 wherein said inner wall portion forms a L-shaped portion at its outward edge, said L-shaped portion having a first arm arranged adjacent to and in close arrangement to said inside surface of said upturned outer wall portion and a second arm arranged adjacent to and in close relation to said outside surface of said duct wall, said second arm terminating at said outwardly-formed tracking ridge.

14. A sheet metal duct in accordance with claim 10 wherein said duct has a second channel formed inwardly in said end portion of said duct wall.

15. A sheet metal duct in accordance with claim 14 wherein said inner wall portion forms a L-shaped portion at its outward edge, said L-shaped portion having a first arm arranged adjacent to and in close arrangement to said inside surface of said upturned outer wall portion and a second arm arranged adjacent to and in close arrangement to said second channel.

16. A sheet metal duct in accordance with claim 10 wherein a second return bend is formed at the outward edge of said inner wall portion, said second return bend extending to said first return bend.

17. A sheet metal duct having a multi-walled integral transverse flange for connecting ends of four-sided sheet metal duct sections, each flange comprising:
    a section comprising an integral part of a duct wall, said duct wall having an inside surface and an outside surface;
    a first upturned inner wall portion extending outwardly from the duct wall, said upturned inner wall portion having an inside surface and an outside surface;
    a second portion bent rearwardly from the outer edge of said upturned inner wall portion into a position opposite an end of the duct wall;
    a third return portion turned-under and rounded back outwardly from the outer end of said second portion, said return portion extending to said outside surface of said inner wall; and
    a fourth outer wall portion extending from the outer edge of said return portion to said inner surface of said duct wall, said outer wall portion being substantially coextensive with and uniformly spaced from said outside surface of said upturned inner wall portion.

18. A sheet metal duct in accordance with claim 17 wherein said outer wall portion forms a L-shaped portion at its outward edge, said L-shaped portion having a first arm arranged adjacent to and in close arrangement to said outside surface of said upturned inner wall portion and a second arm arranged adjacent to and in close relation to said inside surface of said duct wall.

19. A sheet metal duct in accordance with claim 17 said return portion forms a bead, said bead defining a first channel formed between the bead and said upturned inner wall portion.

20. A sheet metal duct in accordance with claim 19 wherein said duct has a second channel formed inwardly in said end portion of said duct wall.

21. A sheet metal duct in accordance with claim 20 wherein said outer wall portion forms a L-shaped portion at its outward edge, said L-shaped portion having a first arm arranged adjacent to and in close arrangement to said outside surface of said upturned inner wall portion and a second arm arranged adjacent to and in close relation to said inside surface of said duct wall.

22. A sheet metal duct in accordance with claim 17 wherein said duct has a ridge parallel and adjacent to said upturned inner wall portion, said ridge defining a channel formed between said ridge and said upturned inner wall portion.

23. A sheet metal duct in accordance with claim 22 wherein said outer wall portion forms a L-shaped portion at its outward edge, said L-shaped portion having a first arm arranged adjacent to and in close arrangement to said outside surface of said upturned inner wall portion and a second arm arranged adjacent to and in close relation to said inside surface of said duct wall.

24. A sheet metal duct in accordance with claim 17 wherein a second return bend is formed at the outward edge of said outer wall portion, said second return bend extending to said first return bend.

25. A method of assembling sheet metal duct sections having integral transverse duct flanges comprising the steps of:

positioning a double walled flange of a first sheet metal duct section adjacent to a double walled section of a second sheet metal duct section;

bringing double walled flange of said first duct section into close relation with double walled flange of said second duct section;

attaching double walled flange of said first duct section to double walled flange of said second duct section by way of a fastening means inserted through said double walled flange of said first duct section and through said double walled flange of said second duct section.

* * * * *